United States Patent
Robbins

(10) Patent No.: US 8,855,120 B2
(45) Date of Patent: Oct. 7, 2014

(54) METHOD AND DEVICE FOR FILTERING MEDIA PACKETS

(75) Inventor: Simon Robbins, Charvil (GB)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 12/974,997

(22) Filed: Dec. 21, 2010

(65) Prior Publication Data

US 2011/0149777 A1     Jun. 23, 2011

Related U.S. Application Data

(60) Provisional application No. 61/289,200, filed on Dec. 22, 2009.

(30) Foreign Application Priority Data

Dec. 21, 2009   (NO) .................................... 20093566

(51) Int. Cl.
| | |
|---|---|
| *H04L 12/28* | (2006.01) |
| *H04L 12/935* | (2013.01) |
| *H04L 12/931* | (2013.01) |
| *H04L 12/939* | (2013.01) |

(52) U.S. Cl.
CPC ............ *H04L 49/3009* (2013.01); *H04L 49/55* (2013.01); *H04L 49/201* (2013.01)
USPC ...................................... 370/395.31; 370/392

(58) Field of Classification Search
USPC ...................... 370/395.31, 474, 428, 429, 392
See application file for complete search history.

(56) References Cited

U.S. PATENT DOCUMENTS

| | | | |
|---|---|---|---|
| 5,684,954 A | 11/1997 | Kaiserswerth et al. | |
| 6,687,247 B1 | 2/2004 | Wilford et al. | |
| 7,013,482 B1 | 3/2006 | Krumel | |
| 7,023,867 B1 * | 4/2006 | Park et al. ..................... | 370/419 |
| 7,203,867 B2 | 4/2007 | Wakasugi | |

(Continued)

FOREIGN PATENT DOCUMENTS

| | | |
|---|---|---|
| EP | 0509648 | 10/1992 |
| EP | 1528709 | 5/2005 |

OTHER PUBLICATIONS

Office Action issued Jun. 24, 2010, in Norwegian Patent Application No. 20093566, filed Dec. 21, 2009 (with English-language abstract).

(Continued)

*Primary Examiner* — Kwang B Yao
*Assistant Examiner* — Tung Q Tran
(74) *Attorney, Agent, or Firm* — Lempia Summerfield Katz LLC

(57) ABSTRACT

A method including: receiving, at a video conferencing device, a packet of a video conferencing media stream, the video conferencing device including a processor; determining, by the video conferencing device, whether a length of the packet is sufficiently long to contain media; sending a request to a Look-up Table memory using the media stream ID as an input value while in parallel determining, with the processor, whether the packet is a valid media packet; in response to receiving a destination address in a media processing network from the Look-up Table memory and determining that the packet is a valid media packet, modifying, by the video conferencing device, a header of the packet with the destination address received from the Look-up Table memory; and transmitting, by the video conferencing device, the packet to the modified destination address.

13 Claims, 7 Drawing Sheets

(56) References Cited

U.S. PATENT DOCUMENTS

| 7,466,703 | B1 | 12/2008 | Arunachalam et al. | |
|---|---|---|---|---|
| 2003/0002448 | A1 | 1/2003 | Laursen et al. | |
| 2003/0012209 | A1 | 1/2003 | Abdelilah et al. | |
| 2003/0099254 | A1* | 5/2003 | Richter | 370/466 |
| 2008/0158338 | A1 | 7/2008 | Evans | |
| 2009/0086760 | A1* | 4/2009 | Vedantham et al. | 370/474 |
| 2010/0002663 | A1* | 1/2010 | Shinozaki | 370/338 |
| 2010/0083281 | A1* | 4/2010 | Malladi et al. | 719/317 |
| 2012/0002642 | A1* | 1/2012 | Dick et al. | 370/331 |

OTHER PUBLICATIONS

International-Type Search Report issued Jul. 13, 2010, in Norwegian Patent Application No. 20093566.
Forwarding Plane. Wikipedia-artikkel, 2008 [Hentet Jun. 23, 2010 fra Internett] (http://en.wikipedia.org/w/index.php?title=Forwarding_plane&oldid=248492468).
Lofgren A et al: "An Analysis of FPGA-based UDP/IP stack parallelism for embedded Ethernet connectivity," Norchip Conference, IEEE, Piscataway, NJ. Nov. 21, 2005, pp. 1-4.
Jan Flora et al: "Tiny15four: A portable, yet Efficient 802.15.4 Stack," IEEE 34th Conference, Piscataway, NJ. Oct. 20, 2009, pp. 842-849.
Sanjay Pratap Singh et al: "Generic Network Interfaces for Plug and Play NoC Based Architecture," Reconfigurable Computing: Architectures and Applications Lecture Notes in Computer Science, Berlin, DE. Jan. 1, 2006. pp. 287-298.
Fernando Luis Herrmann et al: "A Gigabit UDP/IP Network Stack in FPGA" 16th IEEE International Conference, Piscataway, NJ. Dec. 13, 2009. pp. 836-839.
Milind Kulkarni et al: "Scheduling Issues in Optimistic Parallelization" Parallel and Distributed Processing Symposium, IEEE International, Mar. 1, 2007. pp. 1-7.

* cited by examiner

METHOD AND DEVICE FOR FILTERING MEDIA PACKETS

CROSS-REFERENCE TO RELATED APPLICATIONS

The present application claims the benefit of U.S. provisional application 61/289,200, filed Dec. 22, 2009, the entire contents of which are hereby incorporated by reference in their entirety. The present application also claims the benefit of priority from Norwegian patent application NO20093566, filed Dec. 21, 2009, the entire contents of which are hereby incorporated by reference in their entirety.

TECHNOLOGICAL FIELD

The exemplary embodiments described herein relate generally to hardware architectures and associated methods for a multipoint control unit.

BACKGROUND

Video conferencing and the associated hardware, falls broadly into two camps. In the first camp, "conferencing" occurs between only two participants and the participants are connected directly to one another through some form of data network. In this form of network, only two endpoints are involved and true conferencing only occurs if multiple participants are present at one of the two endpoint sites. Examples of this type of conferencing are, at the low technology end, PC enabled endpoints interconnecting using software such as NetMeeting® or Skype® and at the higher end equipment using dedicated endpoint hardware interconnected, for example, via ISDN or IP (Internet Protocol) links.

In the second camp, video conferencing allows more than two endpoints to interact with one another. This is achieved by providing at least one centralized coordinating point; a so-called "multipoint control unit (MCU)", which receives video and audio streams from the endpoints, combines these in a desired way and re-transmits the combined composite video/audio stream to the participants. Often the conference view transmitted to the endpoints is the same for each endpoint. The composition may change over time but is the same for all the participants.

The provision of only a single composition is a significant problem because each participant must therefore receive a conference stream tailored so that it is acceptable to the least capable endpoint in the conference. In this situation therefore many endpoints are not used to their full capacity and may experience degraded images and audio as a result.

More recently, modern MCUs have been designed to allow a unique view to be created for each participant. This allows the full capabilities of each endpoint to be utilized and also allows different compositions for different participants so that, for example, the emphasis of a particular participant in the conference may be different for a different user. However, the processing of video data in real time is a highly processor intensive task. It also involves the movement of large quantities of data. This is particularly so once the data has been decompressed in order to perform high quality processing. Thus, processing power and bandwidth constraints are a significant bottleneck in the creation of high quality video conferencing MCUs which allow multiple views of the conference to be produced.

FIG. 1 shows a conventional MCU architecture. The exemplary architecture has a plurality of digital signal processors 2, such as the Texas Instruments TMS series, which are interconnected via a Time Division Multiplexed (TDM) bus 4. A controller and network interface 6 is also connected to the TDM bus. Each DSP 2 is allocated one or more time-slots on the TDM bus. It will be appreciated that the TDM bus is a significant bottleneck. Whilst increased processing power for the MCU may be achieved by adding more powerful DSPs or additional DSPs, all the data flowing between DSPs and between the network 8 and the DSPs must fit into a finite number of time slots on the TDM bus 4. Thus, this form of architecture generally scales poorly and cannot accommodate the processing requirements of per-participant compositions.

FIG. 2 shows another conventional configuration. In this example, a plurality of DSPs 2-1 are each connected to a Peripheral Component Interconnect (PCI) bus 10-1. Similarly, a plurality of DSPs 2-2, 2-3 and 2-4 are connected to respective PCI buses 10-2, 10-3 and 10-4. The PCI buses 10-2, 10-3 and 10-4 are in turn connected via buffers 12 to a further PCI bus 14. A significant advantage of this architecture over that shown in FIG. 1 is that the DSPs in group 2-1 may communicate amongst one another with the only bottleneck being the PCI bus 10-1. This is true also for the groups 2-2, 2-3 and 2-4. However, should a DSP in group 2-1 wish to communicate with a DSP for example, in group 2-3, the PCI bus 14 must be utilized. Thus, although this architecture is a significant improvement on that shown in FIG. 1 in terms of scalability and the ability to effectively use a plurality of DSPs, the PCI bus 14 must still be used for certain combinations of intra-DSP communication and thus may become a performance limiting factor for the MCU architecture.

Attempts have been made to offload processing from DSPs. For example, IDT (Integrated Device Technology) produces a "Pre-processing switch (PPS)," under part number IDT 70K2000, for use with DSPs. The PPS carries out predetermined functions before delivery to a processor such as a DSP or FPGA. Processing is determined based on the address range on the switch to which packets are sent. The chip is designed, e.g., for use in 3G mobile telephony and is designed, e.g., to offload basic tasks from DSPs which would normally be carried out inefficiently by the DSP.

A third MCU architecture providing a highly scalable and very powerful processing platform is disclosed in U.S. 20080158338 and U.S. 20090213126, both of which are hereby incorporated by reference in their entirety. FIG. 3 shows a motherboard 20, the motherboard carrying a field programmable gate array (FPGA) 24 and multiple daughterboards 22. The FPGA 24 routes data between a controller (not shown), network interface (not shown) and the plurality of daughterboards 22. The links 26 connecting the motherboard 20 with the first layer of a daughterboard may have a bandwidth of, for example, of 3 Gb/sec or higher. Each daughterboard has a plurality of processors, i.e. digital signaling processors (DSPs) interconnected via a daughterboard switch. Each daughterboard switch is configured to switch data between the plurality of DSPs and between the motherboard, daughterboard and other daughterboards. In one example, and with reference to FIG. 4, each daughterboard 20 has four DSPs 28 each with associated memory 30. Each daughterboard also has an FPGA 32 which incorporates a switch 34. The FPGA 32 also includes processors 36, and two high bandwidth links 38. Although this architecture is a great improvement on the alternative conventional techniques as board to board communication is greatly reduced, board to board communication is still dependent on a processor filtering packets and redistributing media packets to the DSP using a full network stack. This creates an unnecessary burden on the processor slowing down the system. Although particularly mentioned in relation to the architecture of FIGS. 3 and 4, this is an even larger problem for PCI bus based MCU architectures shown in FIG. 2.

SUMMARY

An exemplary embodiment described herein is a method including: receiving, at a video conferencing device, a packet of a video conferencing media stream, the video conferencing device including a processor; determining, by the video conferencing device, whether a length of the packet is sufficiently long to contain media; sending a request to a Look-up Table memory using the media stream ID as an input value while in parallel determining, with the processor, whether the packet is a valid media packet; in response to receiving a destination address in a media processing network from the Look-up Table memory and determining that the packet is a valid media packet, modifying, by the video conferencing device, a header of the packet with the destination address received from the Look-up Table memory; and transmitting, by the video conferencing device, the packet to the modified destination address.

Another exemplary embodiment described herein is a video conferencing device including: a tri-FIFO configured to receive a packet of a video conferencing media stream; a Look-UP Table memory; and a processor configured to determine whether a length of the packer is sufficiently long to contain media, determine a media stream ID for the packet, to send a request to the Look-up Table memory using the media stream ID as an input value while in parallel determining whether the packet is a valid media packet, wherein, in response to receiving a destination address in a media processing network from the Look-up Table memory and determining that the packet is a valid media packet, the processor is configured to modify a header of the packet with the destination address received from the Look-up Table memory, and the tri-FIFO is further configured to transmit the packet to the modified destination address.

Another exemplary embodiment described herein is a non-transitory computer readable storage medium encoded with instructions, which when executed by a computer causes the computer to implement a method including: receiving a packet of a video conferencing media stream, the video conferencing device including a processor; determining whether a length of the packet is sufficiently long to contain media; determining a media stream ID for the packet; sending a request to a Look-up Table memory using the media stream ID as an input value while in parallel determining, with the processor, whether the packet is a valid media packet; in response to receiving a destination address in a media processing network from the Look-up Table memory and determining that the packet is a valid media packet, modifying a header of the packet with the destination address received from the Look-up Table memory; and transmitting the packet to the modified destination address.

DETAILED DESCRIPTION

The following description is presented to enable a person of ordinary skill in the art to make and use the various exemplary embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technological advancement. Thus, the present invention is not intended to be limited to the examples described herein and shown, but is to be accorded the scope consistent with the claims.

There is a need in the art for a system and method for filtering media packets from video conferencing media streams without having to resort to a full network stack. The method and system of the exemplary embodiments described herein allows the filtering of media packets from of video conferencing media streams implemented on a small soft-core processor to verify, classify and redirect media packets at gigabit Ethernet line speed.

Figure 1:
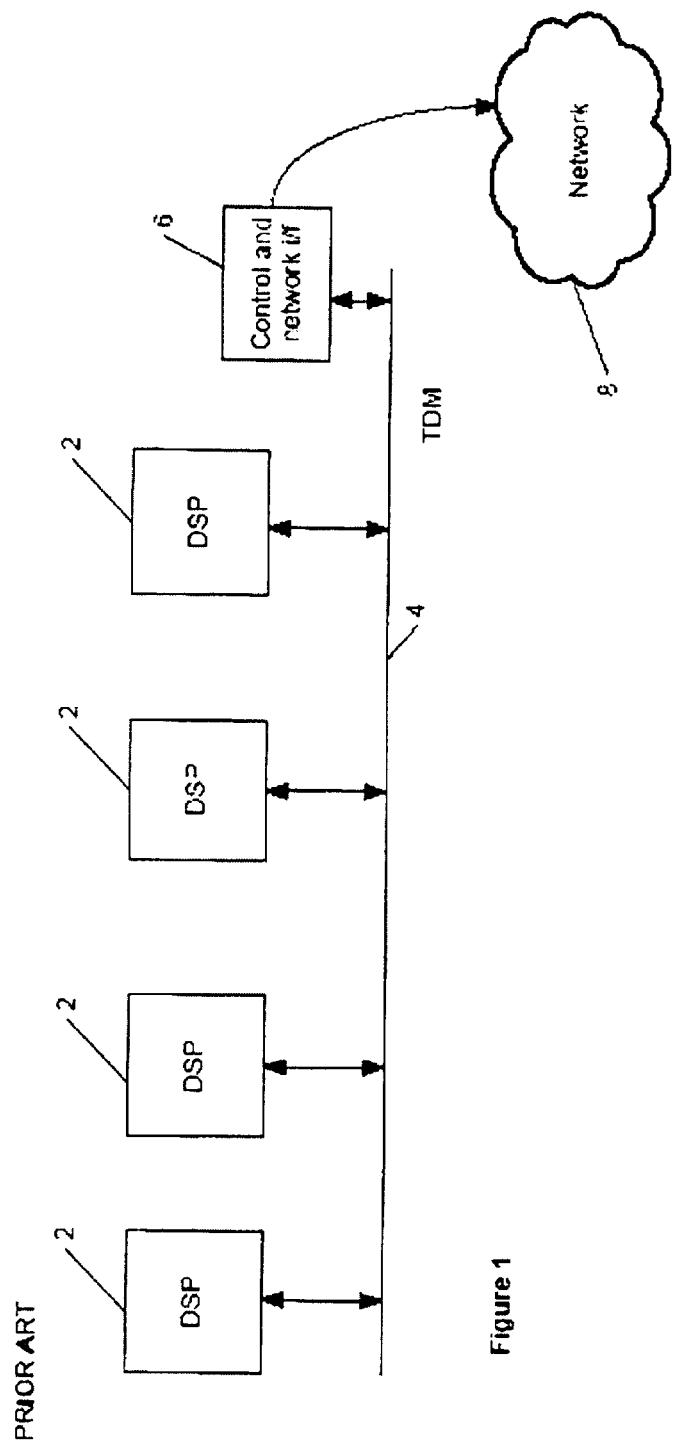
FIG. 1 is a schematic block diagram of a conventional MCU architecture.
Figure 2:
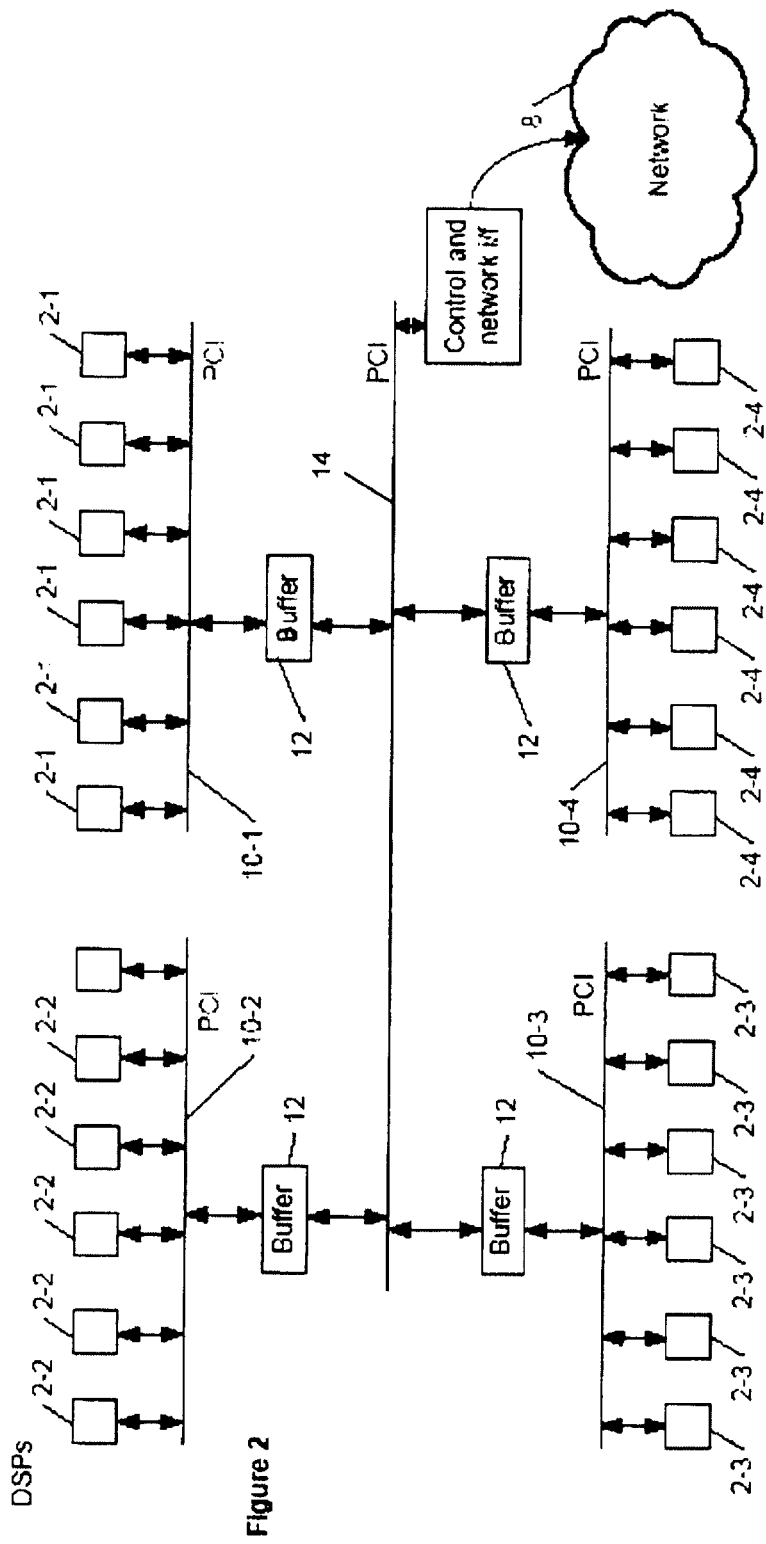
FIG. 2 is schematic block diagram of an alternative conventional MCU architecture.
Figure 3:
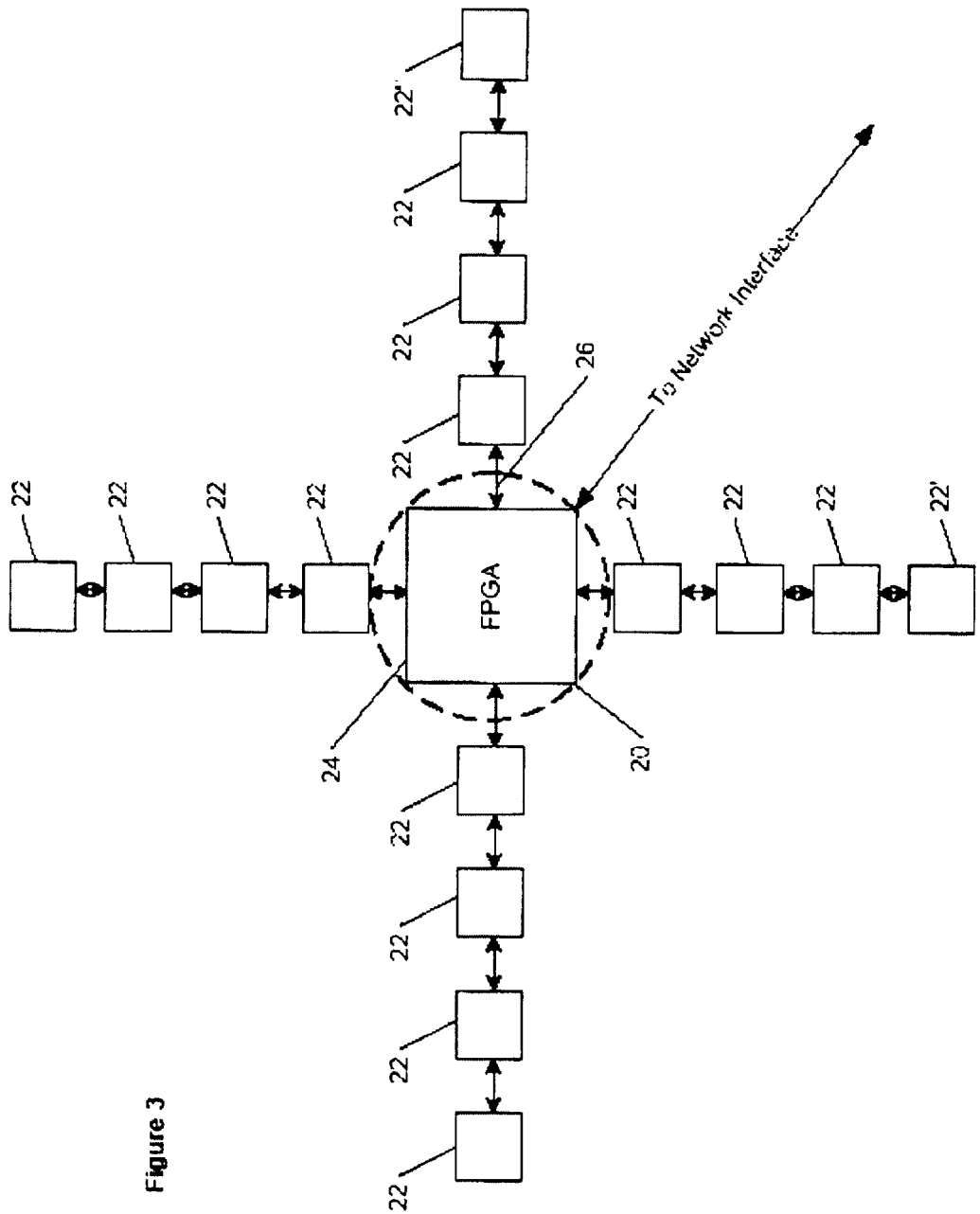
FIG. 3 is a schematic block diagram showing another alternative conventional MCU architecture.
Figure 4:
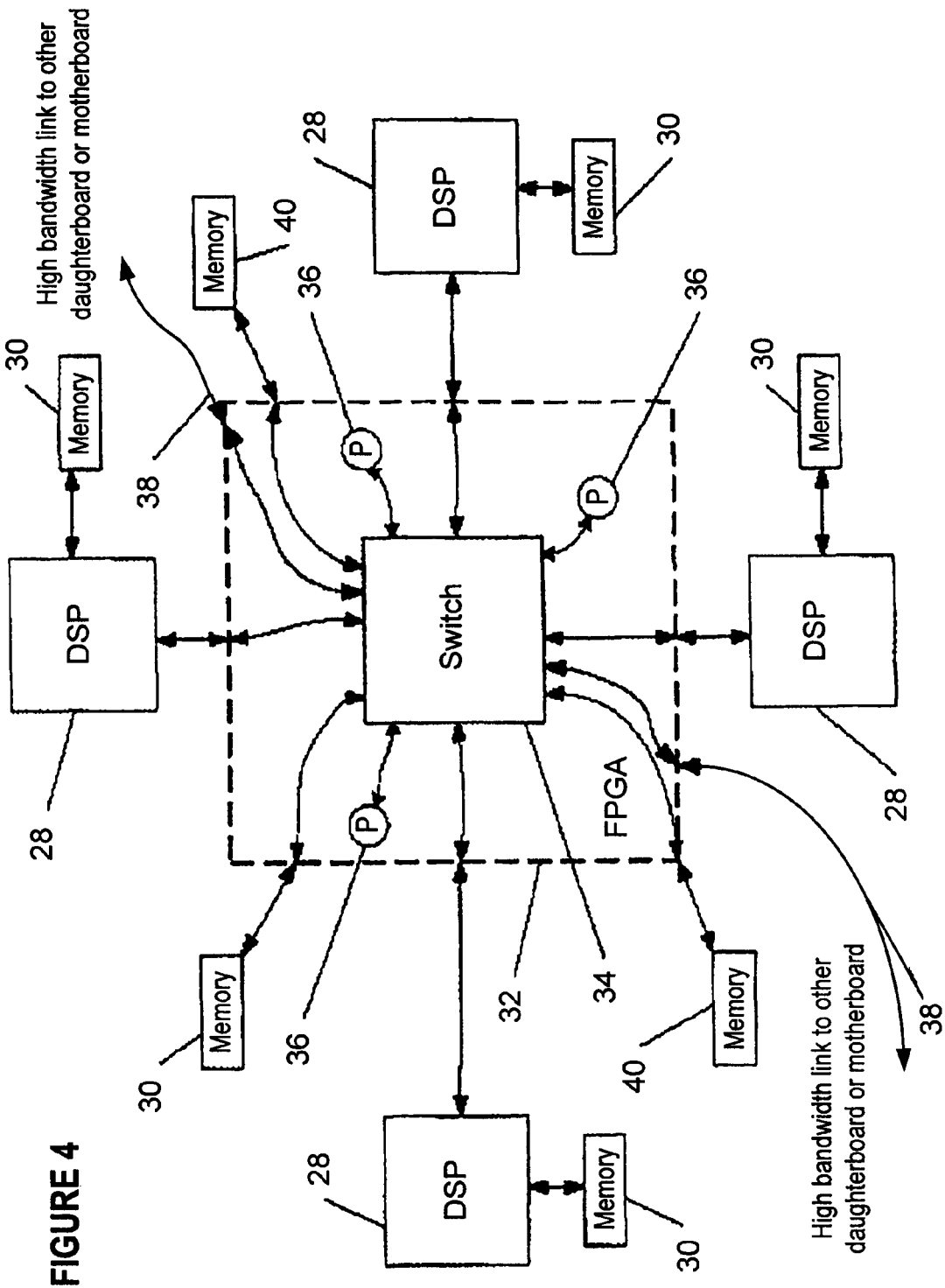
FIG. 4 is a schematic block diagram of a conventional daughterboard in accordance with the conventional MCU architecture of FIG. 3.
Figure 5:
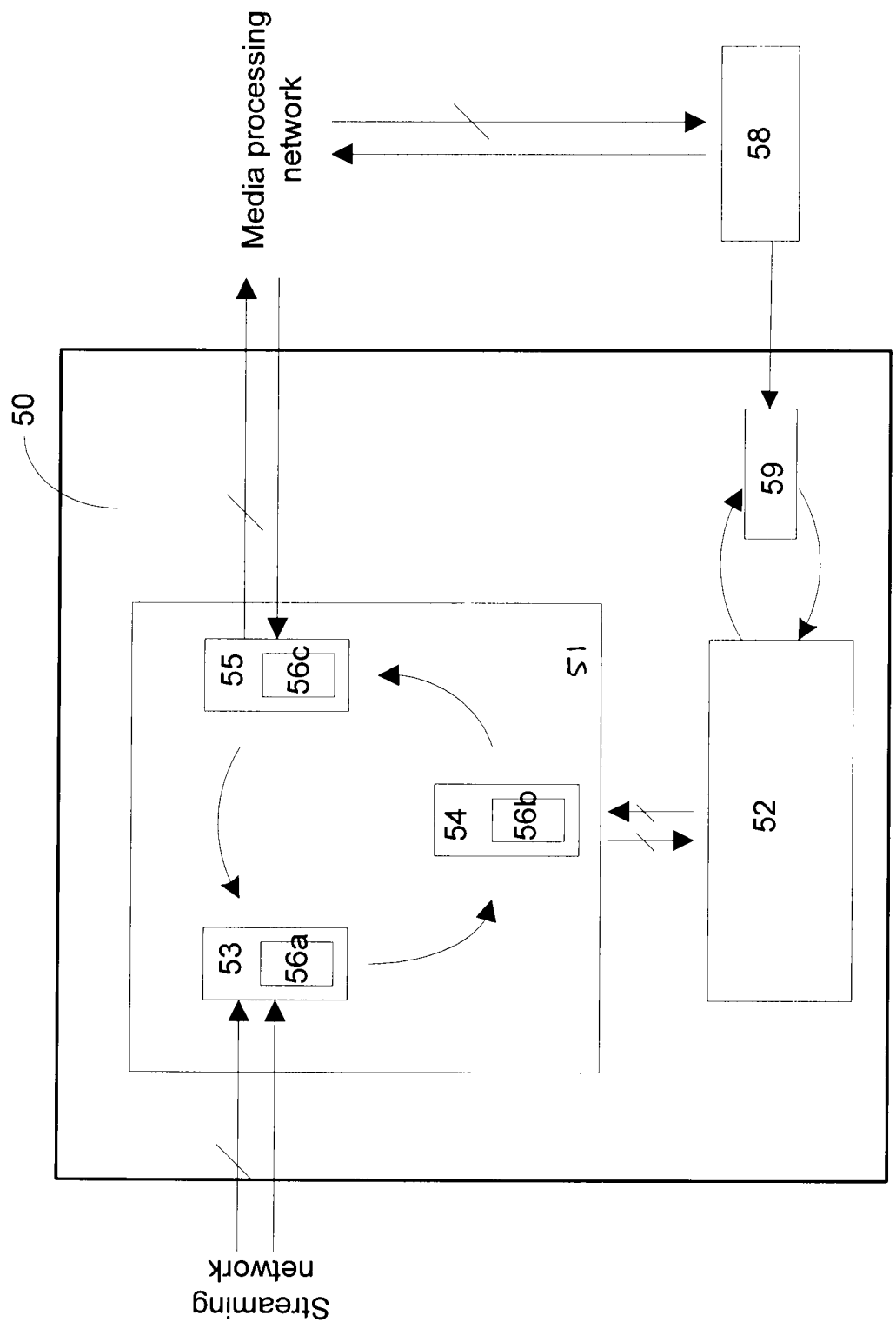
FIG. 5 is a schematic block diagram of a media packet filtering unit in accordance with an exemplary embodiment of the present technological advancement.

With reference to FIG. 5, the media packet filtering unit 50 comprises a tri-FIFO 51, a soft-core processor 52 and a Lookup Table, LUT, 60. The media packet filtering unit 50 may be included in a video conferencing device, such as an MCU or an endpoint. The tri-FIFO 51 is either a synchronous or asynchronous FIFO (First-in First-Out) having three ports 53, 54 and 55. The first port is a data input port 53, typically connected to a data streaming network, the port being configured to receive data and corresponding control signaling according to a network protocol of the data streaming network. The third port is a data output port 55, connected to a media processing network. The media processing network typically includes a multitude of DSP, switches etc. as described above with reference to FIGS. 1, 2 and 3. The media processing network is also connected to a general purpose network in the host MCU, the general purpose stack being controlled by a full network stack, or host network stack 58 (an example of which may be the OSI stack). The host network stack is also in operational connection with the LUT (look up table) 59. The data output port 55 is configured to stream media data into the media processing network according to a network protocol of the media processing network. Alternatively the data output port 55 is configured as a random access read port. The second port is a soft-core processor interface port 54 connected to the soft-core processor 52. The interface port 54 is configured to send and receive data to and from the soft-core processor 52. In an exemplary embodiment of the present invention the interface port 54 is configured as a read/write random access port. Further, the tri-FIFO also comprises at least three, preferably at least four, data packet buffers 56 that are passed between the three ports, looping from port 53 to port 54, port 54 to 55, and finally returning to port 53 from port 55. The data packet buffers are conventional data packet buffers known to a person skilled in the art.

In an exemplary host network stack, the Application layer uses RTP, the Transport layer uses TCP/UDP, the Internet layer uses IP (IPv4), and the Link layer uses Ethernet. The internet layer may be either IPv4 or IPv6, for example. The host network stack may include processing of both UDP and TCP. TCP is used by most control protocols. An RTP stack is also included on the host stack in order to process packets not recognized by the softcore-processor and the LUT so they may be forwarded to the correct destination. The expectation is that the handling of the control elements necessary for correct ethernet and internet operation are handled by the host network stack rather than the softcore-processor and the LUT. This includes handling of ARP, ICMP, and the ethernet PHY and MAC in the relevant device drivers. The fact that there is a softcore-processor and the LUT is transparent to the device-drivers and network stack on the host—the filtered packets (that are not seen on the host) are not required for correct operation of the device drivers and IP network stack.

The soft-core processor 52 as known to a person skilled in the art is a microprocessor core wholly implemented using logic synthesis. It can be implemented via different semiconductor devices containing programmable logic (e.g., FPGA, CPLD). The soft-core processor of the present invention could be an 8-bit, 16-bit or 32-bit processor. The soft-core processor 52 is further communicating with LUT 59 (Look-Up Table memory).

The LUT 59 is utilizing a fast memory to keep information described in more detail. In one exemplary embodiment the LUT is implemented on the same chip as the soft-core processor 52. The fast memory is preferably implemented as on-chip SRAM (internal FPGA memory, e.g. "block RAM"). In another exemplary embodiment the LUT is external to the soft-core processor 52, in which case the fast memory is an external memory, such as DDR2 SRAM.

Although described above as discrete devices, in a preferred embodiment, the tri-FIFO 51, soft-core processor 52 and LUT 59 are implemented in a single FPGA.

Again with reference to FIG. 5, the tri-FIFO 51 receives data from a data streaming network on data input port 53. Dependent on the streaming network protocol, the data input port 53 also receives control signals, such as wr (write) and eop (end of packet), as easily understandable by a person skilled in the art. In this example, data input port 53 first writes to buffer 56*a*. When buffer 56*a* is full, a certain time limit has elapsed, or due to other known triggers, the buffer is passed to soft-core processor interface port 54. Buffer 56*c* is at the same time passed to input port 53 from output port 55, and buffer 56*b* is passed from interface port 54 to output port 55.

At the interface port 54 data from the buffer, (in this example 56*a*), is sent to the soft-core processor 52. The soft-core processor 52 then receives the packets and performs an initial verification of the received packets, followed by a speculative request to the LUT 59 in parallel to continue verification of the received packets employing the method described below with reference to FIG. 6.

Figure 6:
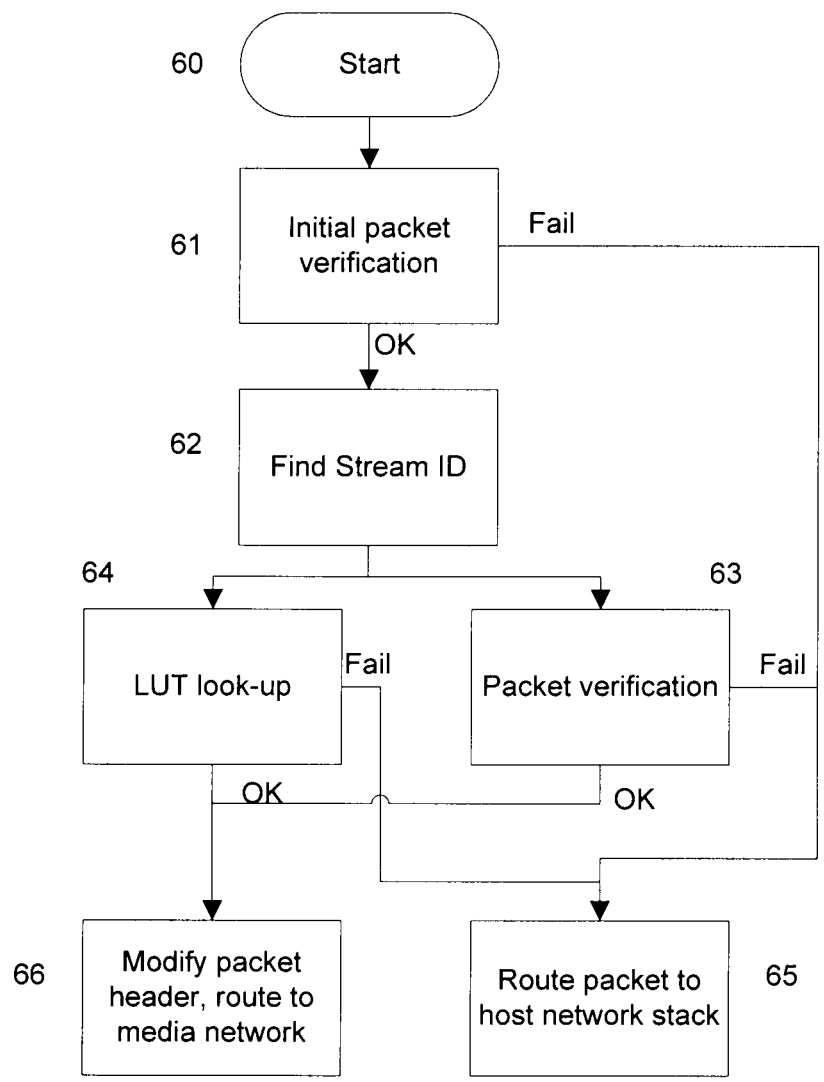
FIG. 6 is a flow chart of a method for media packet filtering according to an exemplary embodiment of the present technological advancement.

FIG. 6 shows a method, wherein the method starts at step 60 when the soft-core processor receives a packet. In an initial verification step 61, the length of the packet is checked to determine whether the packet is sufficiently long to contain media, e.g. RTP (Real-time Protocol) packets containing media. Then, if the packet is found to be a likely candidate to contain media, the header of the packet is read to decide whether the protocol of the packet is supported by the soft-core processor. Alternatively, in an Ethernet embodiment, Ethernet destination verification and Ethernet CRC (cyclic redundancy check) verification would also be part of the initial verification step. In the case that any of these initial verifications fails, the packet is returned to the interface port 54 and processing of the next packet begins. The packet returned to the interface port is eventually routed to the host full network stack 65.

The following includes examples of lengths of various headers.
ethernet header=14 octets (note: minimum ethernet payload is 46 octets)
IPv4header=20 octets
UDP header=8 octets
RTP header=12 octets This implies that, not including the ethernet frame, a datagram containing no payload is 40 octets. We assume that 24 octets are sufficient to contain useful data so datagrams less than 64 octets in length are sent to the host network stack. Datagrams with 64 or more octets in length are considered to be sufficiently long to contain media. 64 octets is only one example, and other values could be used. In some situations, using 40 octets is more reasonable, since it should be the responsibility of the RDP stack in the receiving data-processing node (DSP) to discard invalid datagrams. The soft-core processor 52 and LUT 59 simply need to protect themselves from trying to process non-existent data in the Ethernet frame, resulting in an invalid internal state.

After the initial verification step, the next step 62 is to find a stream ID for the packet. The stream ID is found by reading the packet header length, and depending on the protocol of the packet, reading a field in the packet at an offset from the packet header, e.g. in case of UDP the destination UDP port number. Although described herein with reference to UDP, as the stream ID in a packet always is positioned within the packet at a constant offset to the header according to the protocol of the packet, this method of finding a stream ID is applicable to several other protocols as easily understood by a person skilled in the art with knowledge of the present disclosure. The media stream ID useful for the present technological advancement includes, but is not limited to, the destination port of a UDP Datagram, the RDP SCRID, RTP SSRC, H460/18 multiplex ID etc.

Then, as a request to a LUT, or LUT look-up, takes time, for this exemplary embodiment to work at gigabit Ethernet line speed, a speculative request 64 containing the stream ID is sent to the LUT 59, while further verification 63 of the packet continues in parallel. Speculative in the present disclosure means assuming that the packet corresponding to the stream ID sent to the LUT is a valid uncorrupted media packet, being part of an assumed media stream identified by the stream ID.

In step 64, a request is sent to the LUT 59 using the unique media stream ID as input value or index value. If the media stream ID already exists in the LUT, the soft-core processor 52 receives the information, or meta-data, belonging to that stream ID from the LUT. The information received from the LUT is stream statistics and/or a correct destination address in the media processing network. The address could be IPv4 destination address, interface index (MAC-address), source/destination (src/dst) port or any other network address according to a network protocol. In case the media stream ID is not listed in the LUT, the soft-core processor receives a message that no information exists for that media stream ID, or alternatively receives an empty information message.

While the LUT look-up is taking place, a further verification of the packet corresponding to the media stream ID continues in step 63. The further packet verification, typically including further packet format verifications, header format verifications, packet payload type etc, decides whether the packet is a valid media packet or not. In the case any of these further verifications fails the packet is returned to the interface port 54, any data resulting from the LUT is discarded, and processing of the next packet begins. The packet returned to the interface port is eventually routed to the host full network stack 65.

In the case of a corrupted packet, the look-up in the LUT will be based on spurious data interpreted as the media stream ID. If an entry exists for that media stream ID, the LUT will return valid, but irrelevant data is then discarded when the packet is recognized as invalid by the further packet verification 63.

In case both the further packet verification 63 decides a packet is a valid media packet, and the LUT returns meta-data for a media stream ID corresponding to the packet, then in step 66, the soft-core processor, based on the information received from LUT 59, re-writes the packet headers of the received media packets with correct destination address in the media processing network, and returns the modified packets to the buffer at interface port 54.

Packets belonging to a media stream with a media stream ID not recognized by LUT 59 and/or packets decided not to be valid media packets are returned unmodified to the buffer at interface port 54. When the buffer at interface port 54, (in this example 56a), is full, a certain time limit has elapsed, or due to other known triggers, the buffer is passed to data output port 55. Alternatively, the headers are modified with the address of the host network stack 58.

The data output port 55 reads out data from the buffer, (in this example 56a), and media packets with modified packet headers are sent into the media processing network directly to the respective correct destination addresses in the network. All other packets are routed to the host network stack The host network stack then updates the LUT 59 with the media stream ID's of new media packets and their respective destination addresses in the media processing network. Dependent on the media processing network protocol, the data output port 55 also receives control signals, such as rd (read) and done from the media processing network, as easily understandable by a person skilled in the art.

Figure 7:
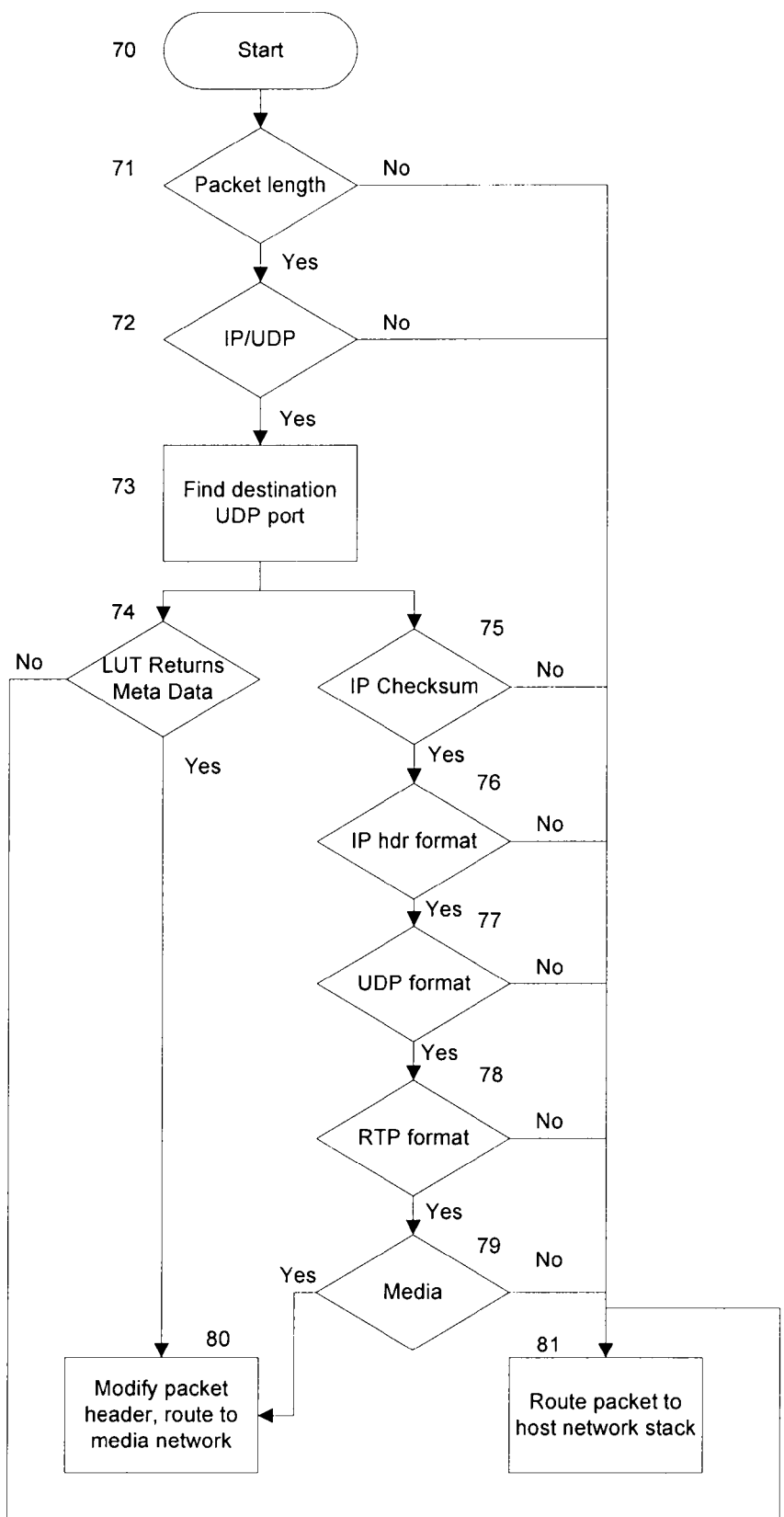
FIG. 7 is another exemplary flow chart of a method for media packet filtering according to the present technological advancement.

FIG. 7 shows another exemplary embodiment, wherein the media packets are RTP packets transported over IP/UDP. In step 71 is the packet length checked to decide whether the packet length is sufficient to contain RTP media packets, in which case the method proceeds to step 72. If the packet is not found to be likely to contain RTP media, the packet is routed to the host network stack, step 81, and processing of the next packet begins.

In the next step, 72, the header of the packet is read to decide whether the packet is an IP/UDP packet. Again, if the packet is not an IP/UDP packet, the packet is routed to the host network stack, step 81, and processing of the next packet begins.

In step 73 a stream ID for the packet is found by reading the IP header length, and the IP header length to offset to the destination UDP port number. A request, 74, is then sent to LUT 59 using the destination UDP port number as input value or index value. In case the destination UDP port number is not listed in the LUT, the LUT sends a message that no information exists for that UDP port number, or alternatively LUT sends an empty information message, and the packet is routed to the host network stack, step 81, and processing of the next packet begins.

If the UDP port number already exists in the LUT, the LUT returns the correct destination address in the media processing network, in this case an IPv4 destination address.

As describe above with reference to FIG. 6, while the LUT look-up takes its time, the packet is further verified in steps 75-79, and again if any of these steps fails the packet is routed to the host network stack, step 81, and processing of the next packet begins. The test in steps 75-79 are common packet verification tests know by person skilled in the art, thus will not be described in detail. Step 75 verifies the IP packet checksum. Step 76 verifies the IP header format, e.g. check IP version number is 4. Step 77 verifies the UDP packet format. Step 78 verifies the RTP packet format; and finally step 79 checks whether the RTP flags and payload type indicates that the packet contains media.

In step 80, the headers of packets identified as RTP media packets and sent over IP/UDP, having the right versions of the protocols, are modified with meta-data received from the LUT and are routed to the correct destination addresses in the media processing network.

Alternatively, the method of FIGS. 6 and 7 may be implemented as a set of computer-readable instructions stored in a non-transitory electronic memory, a hard disk drive, CD, DVD, FLASH drive or any other known non-transitory storage media.

Of course, other features and advantages will be apparent to those skilled in the art. The foregoing system overview represents some exemplary implementations, but other implementations will be apparent to those skilled in the art, and all such alternatives are deemed equivalent and within the spirit and scope of the present invention, only as limited by the claims.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A method comprising:
    receiving, at a video conferencing device, a packet of a video conferencing media stream, the video conferencing device including a processor;
    determining, by the video conferencing device, whether a protocol of the packet is supported by the processor;
    determining, by the video conferencing device, a media stream ID for the packet, the media stream ID of the packet being located by reading a field in the packet at an offset from a header defined by a protocol of the packet;
    determining, by the video conferencing device, whether the packet includes media based on a length of the packet;
    sending a request to a Look-up Table memory using the media stream ID as an input value and in parallel with the sending of the request to the Look-up Table memory, determining, by the processor, whether the packet is a valid media packet;
    in response to receiving a destination address in a media processing network from the Look-up Table memory and determining that the packet is a valid media packet, modifying, by the video conferencing device, the header of the packet with the destination address received from the Look-up Table memory; and
    transmitting, by the video conferencing device, the packet to the modified destination address.

2. The method according to claim 1, wherein in the method further comprises:
    when determining that the packet is a valid media packet and not receiving a destination address in the media processing network from the Look-up Table memory, routing the packet to a full network stack included in the video conferencing device;

resolving a destination address for the packet in a media processing network;

routing the packet to the destination address in the media processing network; and updating the Look-up Table memory with the destination address in the media processing network using a corresponding media stream ID of the packet as an index value.

3. The method according to claim 1, wherein when a length of the packet indicates that the packet does not contain media data, routing the packet to a full network stack.

4. The method according to claim 1, wherein when the protocol of the packet is not supported by the processor, routing the packet to a full network stack.

5. The method according to claim 1, further comprising:
in response to the packet being determined to not be a valid media packet, routing the packet to a full network stack.

6. A video conferencing device comprising:
a tri-FIFO configured to receive a packet of a video conferencing media stream;
a Look-UP Table memory; and
a processor configured to
determine whether the packet includes media based a length of the packet,
determine whether a protocol of the packet is supported by the processor,
determine a media stream ID for the packet, the media stream ID of the packet being located by reading a field in the packet at an offset from a header defined by a protocol of the packet,
send a request to the Look-up Table memory using the media stream ID as an input value and to determine, in parallel with the sending of the request to the Look-up Table memory, whether the packet is a valid media packet,
wherein, in response to receiving a destination address in a media processing network from the Look-up Table memory and determining that the packet is a valid media packet, the processor is configured to modify a header of the packet with the destination address received from the Look-up Table memory, and the tri-FIFO is further configured to transmit the packet to the modified destination address.

7. The video conferencing device according to claim 6, wherein the Look-up Table memory and the processor are implemented on one semiconductor device.

8. The video conferencing device according to claim 6, wherein the tri-FIFO, the Look-up Table memory and the processor are implemented on one semiconductor device.

9. The video conferencing device according to claim 7, wherein the semiconductor device is a Field Programmable Gate Array (FPGA).

10. The video conferencing device according to claim 9, wherein the semiconductor device is a Field Programmable Gate Array (FPGA).

11. The video conferencing device according to claim 6, wherein the tri-FIFO comprises at least three data packet buffers.

12. The video conferencing device according to claim 6, wherein the tri-FIFO comprises four data packet buffers.

13. A non-transitory computer readable storage medium encoded with instructions, which when executed by a computer causes the computer to implement a method comprising:
receiving a packet of a video conferencing media stream, the video conferencing device including a processor;
determining whether the packet includes media based on a length of the packet;
determining, whether a protocol of the packet is supported by the processor;
determining a media stream ID for the packet the media stream ID of the packet being located by reading a field in the packet at an offset from a header defined by a protocol of the packet;
sending a request to a Look-up Table memory using the media stream ID as an input value, and determining in parallel with the sending of the request to the Look-up Table and with the processor, whether the packet is a valid media packet;
in response to receiving a destination address in a media processing network from the Look-up Table memory and determining that the packet is a valid media packet, modifying a header of the packet with the destination address received from the Look-up Table memory; and
transmitting the packet to the modified destination address.

* * * * *